United States Patent
Ellison et al.

(10) Patent No.: US 12,435,394 B2
(45) Date of Patent: Oct. 7, 2025

(54) INTERMETALLIC COMPOUNDS OF COBALT AS TARGETS FOR THE PRODUCTION OF THERANOSTIC RADIONUCLIDES

(71) Applicant: Wisconsin Alumni Research Foundation, Madison, WI (US)

(72) Inventors: Paul A. Ellison, Madison, WI (US); Robert Jerome Nickles, Madison, WI (US); Todd E. Barnhart, Madison, WI (US); Jonathan W. Engle, Middleton, WI (US); Christopher J. Kutyreff, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 58 days.

(21) Appl. No.: 17/610,575

(22) PCT Filed: May 18, 2020

(86) PCT No.: PCT/US2020/033397
§ 371 (c)(1),
(2) Date: Nov. 11, 2021

(87) PCT Pub. No.: WO2020/251727
PCT Pub. Date: Dec. 17, 2020

(65) Prior Publication Data
US 2022/0220586 A1 Jul. 14, 2022

Related U.S. Application Data (60) Provisional application No. 62/859,814, filed on Jun. 11, 2019.

(51) Int. Cl.
*C22C 19/07* (2006.01)
*G21G 1/10* (2006.01)
*G21G 4/00* (2006.01)

(52) U.S. Cl.
CPC .............. *C22C 19/07* (2013.01); *G21G 1/10* (2013.01); *G21G 4/00* (2013.01)

(58) Field of Classification Search
CPC ....... C01B 19/007; C22C 19/00; C22C 19/07; G21G 1/10; G21G 4/00
(Continued)

(56) References Cited

U.S. PATENT DOCUMENTS

| 8,098,789 B2 * | 1/2012 | Nye | G21G 1/10 376/190 |
| 2007/0064858 A1 * | 3/2007 | Nye | G21G 1/10 376/157 |

(Continued)

FOREIGN PATENT DOCUMENTS

| EP | 3557955 A1 * | 10/2019 | ............. B22F 3/105 |
| WO | WO2018/007643 | 1/2018 | |

OTHER PUBLICATIONS

NPL-1: Experimental studies and nuclear model calculations on proton-induced reactions on natSe, 76Se and 77Se with particular reference to the production of the medically interesting radionuclides 76Br and 77Br, Applied Radiation and Isotopes 60 (2004) 899-909 (Year: 2004).*

(Continued)

*Primary Examiner* — Jie Yang
(74) *Attorney, Agent, or Firm* — Bell & Manning, LLC (57) ABSTRACT

Cobalt intermetallic compounds that include cobalt and a second element are provided. The isotopes of the second element in the compounds are present in their natural isotopic abundance or in an enriched isotopic abundance. Methods of making the compounds and methods of using the compounds as targets in the production of radionuclides are further provided.

8 Claims, 5 Drawing Sheets

(58) Field of Classification Search
USPC .............................................................. 420/6
See application file for complete search history.

(56) References Cited

U.S. PATENT DOCUMENTS

| | | |
|---|---|---|
| 2013/0170593 A1 | 7/2013 | Jansen et al. |
| 2015/0003576 A1 | 1/2015 | Uhland et al. |
| 2017/0316855 A1* | 11/2017 | Deligianni .............. H01F 10/30 |
| 2018/0211737 A1 | 7/2018 | Pipes |
| 2019/0019591 A1 | 1/2019 | Uhland et al. |

OTHER PUBLICATIONS

Hassan et al., "Investigation of selenium compounds as targets for $^{76,77}$Br production using protons of energies up to 34 MeV," *Radiochim. Aca* 2017; 105(10):841-850.

Yoshinaga et al., "Generator-produced rubidium-82 positron emission tomography myocardial perfusion imaging—From basic aspects to clinical applications," *Journal of Cardiology* (2010) 55, 163-173.

P.W. Schmor, "Review of Cyclotrons Used in the Production of Radio-Isotopes for Biomedical Applications," *Proceedings of CYCLOTRONS 2010*, Lanzhou China.

International Search Report and Written Opinion for PCT/US2020/033397, mailed Aug. 27, 2020.

Kutyreff et al., "Ga—Co Compounds for Production of Germanium Radioisotopes," Abstract from 17th Workshop on Targetry and Target Chemistry, Coimbra, Portugal, Aug. 2018.

Das et al, "Production of $^{61}$Cu using natural cobalt target and its separation using ascorbic acid and common anion exchange resin," *Applied Radiation and Isotopes*, 70 (2012) 365-368.

Ellison et al., "Improved production of $^{76}$Br, $^{77}$Br and $^{80m}$Br via CoSe cyclotron targets and vertical dry distillation," *Nuclear Medicine and Biology* 80 (2020) 32-36.

Jansen et al., "The Reactions $^{77}$Se(p, n) and $^{78}$Se(p, 2n) as Production Routes for $^{77}$Br," *International Journal of Applied Radiation and Isotopes*, vol. 31, pp. 405-409, 1980.

* cited by examiner

INTERMETALLIC COMPOUNDS OF COBALT AS TARGETS FOR THE PRODUCTION OF THERANOSTIC RADIONUCLIDES

CROSS-REFERENCE TO RELATED APPLICATIONS

This present application is a National Stage of International Application No. PCT/US2020/033397, filed May 18, 2020, which claims priority to U.S. provisional application No. 62/859,814 that was filed Jun. 11, 2019, the entire contents of which are incorporated herein by reference.

REFERENCE TO GOVERNMENT RIGHTS

This invention was made with government support under DE-SC0017919 awarded by the U.S. Department of Energy. The government has certain rights in the invention.

BACKGROUND

Radionuclides have uses in a variety of applications, including preclinical diagnostic imaging. These radionuclides are often produced by charged or neutral particle (e.g. proton, neutron) irradiation of a target material through the use of a particle accelerator, such as a cyclotron. However, the physical properties of the target materials used to produce radionuclides via particle bombardment often result in inadequate radionuclide production capacities.

The radionuclides of bromine have long been of interest to the nuclear medicine community. These include diagnostic positron-emitter $^{76}$Br ($t_{1/2}$=16.2 h) and therapeutic Auger-emitters $^{77}$Br ($t_{1/2}$=57.0 h) and $^{80m}$Br ($t_{1/2}$=4.42 h). Radiobromine exhibits organochemical versatility and participates in a variety of labeling reactions. Additionally, radiobromine has several advantages over the radionuclides of iodine in that the C—Br bond is more stable than the C—I bond, resulting in less dehalogenation of radiolabeled compounds in vivo, and radiobromide ions liberated due to in vivo dehalogenation do not accumulate in the thyroid, distributing the off-target dosimetric burden compared with radioiodine. These properties make the radionuclides of bromine uniquely suited among all medical radionuclides for incorporation into small molecule theranostic agents.

The production of the medical radionuclides of bromine has been accomplished using various binary intermetallic compounds of transition metals and selenium and small biomedical cyclotrons via the $^{77}$Se(p,n)$^{77}$Br, $^{76}$Se(p,n)$^{76}$Br, and $^{80}$Se(p,n)$^{80m}$Br nuclear reactions. However, the proton irradiation of selenium poses significant challenges due to the element's low electrical and thermal conductivity, low boiling point, and high vapor pressure. Due to these challenges, the production capacity per three-hour irradiation for radionuclidically pure $^{76}$Br and $^{77}$Br remains limited to ~2 and ~0.7 GBq, respectively, dramatically less than necessary for supporting large scale preclinical studies of radiobromine labeled theranostic agents. These low yields are primarily due to the thermal limitations of the selenium compound target materials, which tolerate a maximum proton intensity of <20 µA, a small fraction of modern medical cyclotrons' 300+ µA capabilities.

Germanium radionuclides are also of interest to the medical community. For example, $^{68}$Ge ($t_{1/2}$=271 d, 100% EC) is a long-lived parent in a generator device which produces the short-lived, radionuclide $^{68}$Ga for positron emission tomography imaging with FDA-approved neuroendocrine and prostate cancer-targeting radiotracers. The theranostic isotope pair $^{69}$Ge ($t_{1/2}$=39.05 hr, 24% β+, $E_{max}$=1205 keV) and $^{71}$Ge ($t_{1/2}$=11.43 d, 100% EC) offers the prospect of a novel positron-emitting radionuclide for diagnostic experiments. However, the production of radionuclides from elemental gallium targets is challenging. In its elemental form, gallium melts at 30° C. and the liquid reacts strongly with most metals, compromising many standard accelerator target systems. To avoid elemental Ga targets and improve thermal tolerance and survivability in the beam of the targets, Ga—Ni compounds have been used; however, incorporation of nickel results in the formation of $^{60}$Cu as well as other undesirable activation products.

Iodine radionuclides, such as $^{124}$I($t_{1/2}$=4.17 d, 22.7% β+$E_{max}$=2.13 MeV), are used for PET imaging due to their physiological versatility and well-known labeling chemistry. Historically, several low energy biomedical cyclotrons have used the $^{124}$Te(p,n)$^{124}$I nuclear reaction to make small quantities of radionuclidically pure $^{124}$I available locally. But the large production capability of commercial, high intensity cyclotrons distributed across the United States would be able to reliably supply the national market with $^{124}$I. Unfortunately, a combination of factors has prevented production expansion, centering primarily on the complexity of the target systems, expense of the enriched substrates, low reaction yields, and extensive post-processing to reclaim the target material.

SUMMARY

Cobalt intermetallic compounds, methods for making the intermetallic compounds, and methods for using the intermetallic compounds as targets in the production of radionuclides are provided.

One embodiment of an isotopically enriched cobalt intermetallic compound contains cobalt and a second element, wherein the second element is isotopically enriched and is selected from the group consisting of selenium, tellurium, chromium, calcium, titanium, germanium, rubidium, and sulfur.

One embodiment of a method of generating a radionuclide includes the step of bombarding a cobalt intermetallic compound with bombarding particles in a particle accelerator. The cobalt intermetallic compound contains cobalt and a second element, wherein the second element is selected from the group consisting of selenium, tellurium, chromium, calcium, titanium, germanium, rubidium, and sulfur. The bombarding particles have energies that are sufficiently high to induce a nuclear reaction that produces the radionuclide from the cobalt intermetallic compound.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

initial $H_2O$ bubble trap, and (118) scrubber assembly with empty, $H_2O$, and 1 mM $Na_2S_2O_5$ tubes, respectively.

FIG. 5, graph region (a) is during furnace distillation; FIG. 5, graph region (b) is during the quench/cooling period; FIG. 5, graph region (c) is during the $H_2O$ rinse of outlet quartz and PTFE lines; and FIG. 5, graph region (d) is during the quaternary methyl amine anion exchange cartridge loading.

DETAILED DESCRIPTION

Cobalt intermetallic compounds, methods for making the intermetallic compounds, and methods for using the intermetallic compounds as targets in the production of radionuclides are provided. Various embodiments of the methods are able to produce radionuclides in quantities and purities that make large scale production, distribution, and clinical application possible using low and medium energy proton accelerators.

The intermetallic compounds include cobalt and a second element, wherein the second element is of natural or enriched isotopic abundance. As used herein, the terms enriched isotopic abundance and isotopically enriched mean that the relative abundance of at least one isotope of the element has been enriched relative to the natural abundance of that isotope in that element. For example, selenium that is isotopically enriched in its 76-isotope, relative to the abundance of the 76-isotope in naturally occurring selenium, is designated $^{76}Se$. In some instances, the isotopically enriched element consists of only the "enriched" isotope of that element. Elements having a natural isotopic abundance are designated herein as "nat"; for example, selenium having a natural isotopic abundance is designated as $^{nat}Se$.

Elements that may be included in the cobalt intermetallic compounds include elements that are capable of forming stoichiometrically stable intermetallic compounds with melting points higher than those of the pure element in the absence of cobalt, and capable of wetting thermally conductive metal substrates that are used for incorporation into common irradiation geometries. These elements include the metalloids selenium and tellurium, the metals gallium, chromium, calcium, titanium, germanium, and rubidium, and the nonmetal sulfur.

The intermetallic compounds can be synthesized by heating a stoichiometric mixture of cobalt powder and a powder of the isotopically enriched second element in an inert environment for a time sufficient for intermetallic compound formation. The intermetallic compounds can then be formed into cyclotron targets by hot pressing onto a target backing in a furnace followed by rapid cooling. The target backing may be composed of a variety of materials, provided it is highly thermally conductive, and may be water-cooled in order to cool the intermetallic compound target material during proton bombardment. Suitable target backing materials include niobium, cobalt, nickel, copper, and aluminum.

When the intermetallic compounds are bombarded with energetic bombarding particles, nuclear reactions form radionuclides, which can be radiochemically isolated for a variety of applications. The choice of bombarding particle and irradiation parameters will depend on the specific target material being used, the desired radionuclides, and the radionuclide yield and purity requirements. Suitable bombarding particles include charged particles (e.g., protons) and neutral particles (e.g., neutrons). The reactions can be carried out in a cyclotron. However, other particle accelerators, including linear accelerators, can be used. For some target materials and radionuclides, relatively low energy protons can be used, including protons having energies of about 30 MeV or lower. By way of illustration, low energy cyclotrons commonly utilize protons having energies in the range from about 10 MeV to 24 MeV. However, higher or lower proton energies can be used.

As one of ordinary skill in the art will understand, the radionuclides produced by a given target compound will depend on the stable isotopes present in the target compound, the beam energy, and the resulting nuclear reactions. Many of the radionuclides produced from the cobalt compounds described herein are produced via a (p,n) nuclear reaction. However, others are produced by different nuclear reactions, including (p,xn) (e.g., x=2, x=3, etc) and (p,alpha) reactions. The cobalt compounds can be used to produce short-lived radionuclides. These radionuclides have short half-lives, typically on the order of minutes to hours, so that their radioactivity rapidly decreases to a safe level after use. These short-lived radionuclides are typically used immediately after production to synthesize radiopharmaceuticals emitting γ-rays, positrons, or electrons. Other radionuclides produced from the cobalt intermetallic compounds are generator radionuclides. These are longer-lived parent radionuclides from which a different short-lived radionuclide is formed continually as a result of decay. The short-lived radionuclide can be periodically separated from the generator radionuclide for use in a diagnostic or therapeutic application. The isotope pairs $^{68}Ge/^{68}Ga$ and $^{82}Sr/^{82}Rb$ are examples of radionuclide generators and their short-lived products.

If the radionuclides being produced and collected are sufficiently volatile, a thermochromatographic "dry distillation" can be used to isolate the radionuclides from the irradiated target materials by evaporation at high temperature. This can be carried out by transferring the irradiated targets to a furnace under an inert environment, heating the irradiated target materials to release the radionuclides, and collecting the released radionuclides for use. Alternatively, for less volatile radionuclides, isolation can be carried out using column extraction chromatography with an extraction resin.

Once formed, the radionuclides can be used to label small amounts of a pharmaceutical compound of interest, creating radiopharmaceuticals. Positron emitting radionuclides can be used to label a variety of different compounds, allowing the study of biological systems using positron emission tomography (PET) imaging.

One illustrative embodiment of a method for producing radionuclides uses cobalt selenide (CoSe) intermetallic compounds as targets for the production of theranostic bromine radionuclides. For example, CoSe intermetallic compounds containing 50 to 60 mol % Se can be used. Using the method, high purity $^{77}$Br, $^{76}$Br, and $^{80m}$Br radionuclides can be generated by the irradiation of Co$^{77}$Se or Co$^{78}$Se, Co$^{76}$Se, and Co$^{80}$Se intermetallic compound targets, respectively. A detailed description of this method is provided in Example 1. The use of CoSe targets mitigates the thermal and dosimetric limitations of other radiobromine production targets because the CoSe intermetallic compounds are able to tolerate higher intensity proton irradiations and produce more radiobromine than has previously been reported. Moreover, CoSe targets have the advantage of releasing radiobromine that can be recovered efficiently using a dry distillation process in a vertical distillation assembly, allowing for a simplified radiochemical isolation and the reuse of the isotopically enriched CoSe target for many subsequent productions of the radionuclides. The use of a vertical dry distillation assembly offers several key advantages over horizontal assemblies, including better hot cell compatibility, more rapid heating, and quench cooling of CoSe targets. Other radionuclides that can be formed via proton bombardment of CoSe targets include: $^{71}$As, which can be formed using a Co$^{74}$Se target; $^{74}$As, which can be formed using a Co$^{77}$Se target; and $^{77}$As, which can be formed using a Co$^{80}$Se target.

Another illustrative embodiment of a method for producing radionuclides uses cobalt gallium (CoGe) intermetallic compounds as targets for the production of germanium radionuclides. Using the method, high purity $^{68}$Ge, $^{69}$Ge, and $^{71}$Ge radionuclides can be generated by the irradiation of Co$^{nat}$Ga, Co$^{69}$Ga, and Co$^{71}$Ga compound targets, respectively. A detailed description of methods of making CoGa intermetallic compounds for the production of germanium radionuclides is provided in Example 2. The radionuclide $^{68}$Ge can be used as a long-lived parent in a generator device which produces the short-lived radionuclide $^{68}$Ga for PET imaging. The $^{69}$Ge and $^{71}$Ge can be used as a theranostic pair, capable of both imaging and treatment of human disease.

Yet another illustrative embodiment of a method for producing radionuclides uses cobalt telluride (CoTe) intermetallic compounds as targets for the production of iodine radionuclides. Using the method, high purity $^{124}$I and $^{123}$I radionuclides can be generated by the irradiation of Co$^{124}$Te and Co$^{123}$Te intermetallic compound targets, respectively. The radionuclides $^{123}$I can be used in SPECT and Auger therapy and $^{124}$I can be used in PET imaging in diagnostic and therapeutic applications.

Other cobalt intermetallic compounds that can be used to form radionuclides include: Co$^{52}$Cr compounds (25-45 mol % Co), which can be used as targets for the production of $^{52g}$Mn; Co$^{42,43,44,46,48}$Ca compounds (85-95 mol % Co), which can be used as targets for the production of $^{43}$Sc, $^{44}$Sc, and $^{47}$Sc; Co$^{46,47,50}$Ti compounds (45-55 mol % Co), which can be used as targets for the production of $^{43}$Sc, $^{44}$Sc, and $^{47}$Sc; Co$^{70,72,74}$Ge compounds (50-70 mol % Co), which can be used as targets in the production of $^{71}$As, $^{72}$As, and $^{74}$As; Co$^{34}$S compounds (40-60 mol % Co), which can be used as targets in the production of $^{34m}$Cl; and CoRb compounds (40-60 mol % Co), which can be used as targets in the production of $^{82}$Sr/$^{82}$Rb generators. These cobalt compounds can be synthesized using the procedures outlined in Examples 1 and 2 with the corresponding elemental starting powders. The mole percent ranges listed above are illustrative ranges for the cobalt content of the intermetallic compounds; however, percentages outside of these ranges can be used.

EXAMPLES

Example 1: Production of Bromine Radionuclides from Cobalt Selenide Intermetallic Compounds This example describes a method by which high radionuclidic purity $^{76}$Br, $^{77}$Br, and $^{80m}$Br are each produced via the proton irradiation of Co$^{76/77/80}$Se targets. Cyclotron production yields were 103±10 MBq/(μA·h) for $^{76}$Br, 88±10 MBq/(μA·h) for $^{80m}$Br at 16 MeV, and 17±1 MBq/(μA·h) for $^{77}$Br at 13 MeV. Optimized dry distillation radiobromine recovery was 76±11% in a small volume of aqueous solution. A $^{77}$Br-labeled radiopharmaceutical with apparent molar activity up to 700 GBq/μmole was synthesized via copper-mediated aryl boronic ester bromination.

Materials and Methods

Cobalt powder (Alfa Aesar, 1.6 μm, 99.8%), natural enrichment selenium powder (Acros Organics, 200 mesh, 99.5%), and isotopically enriched selenium powders (Isoflex USA) of isotopic abundance summarized in Table 1 were used for the synthesis of the intermetallic CoSe. Fused quartz tubing (QSI Scientific, Inc) was used for the in-house fabrication of vacuum ampules and furnace assembly parts. Boron nitride (Alfa Aesar) was machined for furnace assembly parts, cleaned with ethanol and baked at 1000° C. prior to use. 1-(4-(4,4,5,5-tetramethyl-1,3,2-dioxaborolan-2-yl) phenyl)-8,9-dihydro-2,7,9a-triazabenzo[cd]azulen-6(7H)-one (pre-KX1-Bpin) and 1-(4-iodophenyl)-8,9-dihydro-2,7, 9a-triazabenzo[cd]azulen-6(7H)-one (KX-1) were synthesized at the University of Pennsylvania as previously described. (Reilly, S. W. et al., 2018, Org. Lett. 20, 1752-1755.) Copper catalyst (tetrakis(pyridine)copper (II) triflate; Cu(py)$_4$(OTf)$_2$) and ligand (3,4,7,8-tetramethyl-1,10-phenanthroline; Lig) were obtained from Sigma Aldrich. Sep-Pak QMA Plus Light (Waters, QMA light) cartridges were prepared with 1 mL of 1 M KHCO$_3$ and 10 mL water, and Sep-Pak C18 Plus light (Waters, C18 light) cartridges were prepared with 5 mL ethanol and 10 mL water prior to use. All other chemicals were purchased from Sigma Aldrich and used as received.

TABLE 1

Isotopic abundances of enriched selenium target material.

| | Isotopic composition (%) | | | | | |
|---|---|---|---|---|---|---|
| | $^{74}$Se | $^{76}$Se | $^{77}$Se | $^{78}$Se | $^{80}$Se | $^{82}$Se |
| $^{76}$Se | <0.05 | 99.8 ± 0.1 | 0.2 ± 0.1 | <0.05 | <0.05 | <0.05 |
| $^{77}$Se | 0.02 | 0.14 | 99.66 | 0.09 | 0.05 | 0.04 |
| $^{80}$Se | 0.01 | 0.03 | 0.02 | 0.01 | 99.9 | 0.02 |

Preparation of Cobalt Selenide Target Material.

Cobalt selenide was formed by weighing an equal molar ratio of cobalt (110-130 mg) and selenium (150-170 mg) into a quartz test tube. The tube was flushed by repeated evacuation to <100 Pa and back filling with argon and sealed under vacuum. Over 100 minutes, the upright tube was heated from room temperature to 1200° C. where it was held for one hour, then removed from the furnace and rapidly cooled by immersing in water.

Preparation and Characterization of CoSe Cyclotron Targets

Figure 1:
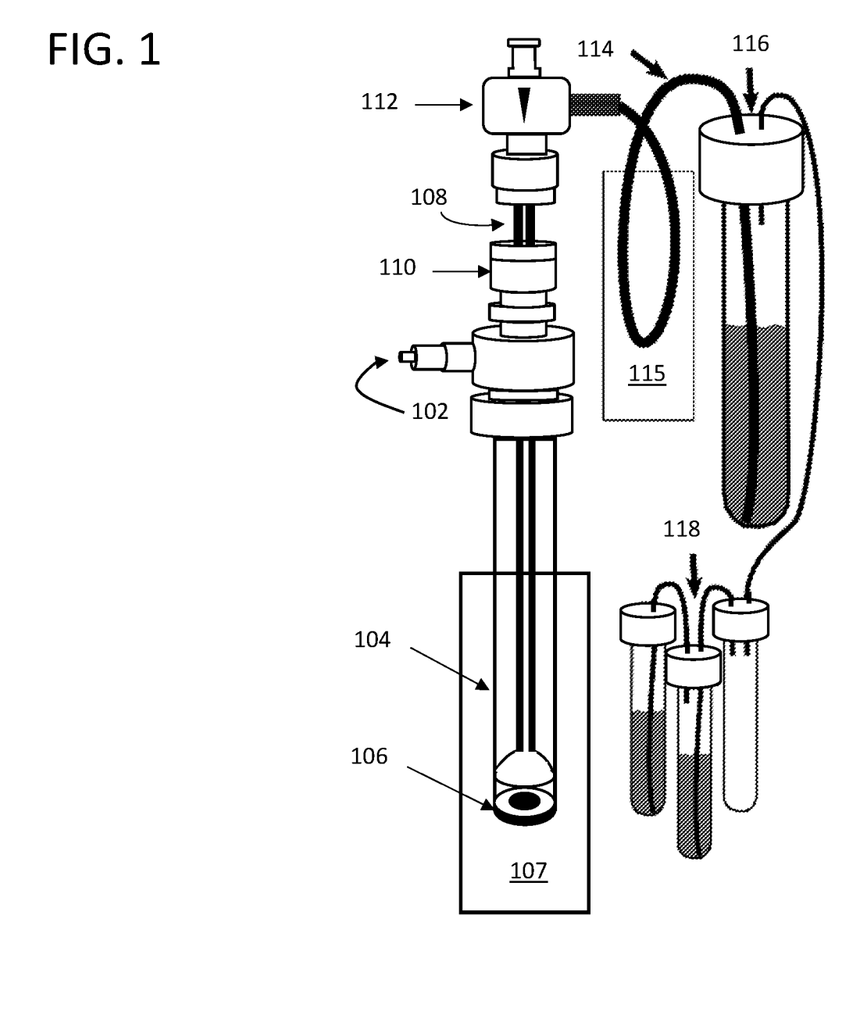
FIG. 1 depicts a radiobromine furnace assembly with (102) Ar gas inlet, (104) 14 cm outer flat-bottomed quartz tube for Ar inlet, (106) CoSe target disc, (108) 24 cm inner bell-bottomed quartz tube for Ar outlet, (110) furnace assembly outlet compression fitting, (112) 3-way Hamilton valve, (114) ⅛" PTFE line through ice-water bath, (116)

CoSe cyclotron targets were formed by hot pressing CoSe into a pocketed (∅=9.5 mm, 1 mm deep) niobium disc (∅=19 mm, 2 mm thick) using the vertical furnace assembly shown in FIG. 1. The Nb disc, a ~250 mg CoSe pellet, and a boron nitride (BN) tamper were placed at the bottom of the flat-bottomed quartz tube (104) and flushed with argon through the assembly gas inlet (102). The tube was then lowered into a preheated vertical tube furnace (107) at 1075-1100° C. for 5 minutes and flattened by loosening the outlet compression fitting (110) and applying <0.1 MPa of pressure to the BN tamper with the bell-bottomed inner quartz tube (108). The CoSe target was rapidly cooled by lifting the assembly from inside the furnace and immediately immersing in water. This process was repeated using BN tampers of various configurations until CoSe was uniform and well adhered in the pocket of the niobium disc. CoSe that wetted face of the niobium disc outside the pocket was removed using a razor blade and reclaimed. The face of the niobium disc was then polished using fine grit sandpaper, creating a suitable surface for an o-ring seal. A prepared Nb-backed CoSe cyclotron target was analyzed by X-ray diffraction using a Bruker D8 Discovery X-ray Diffractometer with a Cu Kα (1.54 Å) X-ray source and a Vantec-500 detector. Diffraction data was acquired using a 2 mm cone diameter and 0.6 per min sample rotations.

Cyclotron Irradiation of CoSe Targets

Cyclotron irradiations with 0.25-2.5 hour durations of $Co^{nat}Se$, $Co^{80}Se$, $Co^{76}Se$, and $Co^{77}Se$ targets with 5-40 µA of 11-16 MeV orthogonally incident protons were performed using the University of Wisconsin GE PETtrace cyclotron. CoSe targets were cooled with a water-jet directly to the back of the Nb disc using an ARTMS QIS solid target system. The radiobromine production yield and radionuclidic purity at the end of bombardment (EoB) was investigated at four proton energies by employing a water-cooled degrader foil positioned 3.6 cm away from the face of the CoSe target. Molybdenum and tungsten foils (Alfa Aesar) were used as proton energy degrader foils with a 0.25 mm Mo foil degrading the 16 MeV primary beam to 11 MeV, a 0.20 mm Mo foil degrading to 12 MeV, and a 0.10 mm W foil degrading to 13 MeV, based on calculations performed with SRIM-2013.00. (Ziegler et al., 2010. Nucl. Inst. Meth. Phys. Res. B 268(11-12), 1818-1823.) The radioactivity in the CoSe target was directly estimated by high purity germanium (HPGe) spectrometry or dose calibrator measurements of fractions following radiochemical separation.

Dry Distillation of Radiobromine from CoSe Targets

Radiobromine was isolated from irradiated CoSe targets by thermal chromatographic distillation using the furnace assembly shown in FIG. 1. Following irradiation, the Nb-backed CoSe was removed from the QIS transfer capsule, dried, placed in the flat-bottomed quartz tube (104), sealed inside the assembly, and flushed with 50 mL/min argon flow. The sealed, argon-flushed quartz tube (104) was then lowered into the tube furnace preheated to 1050° C. Collimated detectors monitored the radioactivity in the CoSe target (106) and the initial $H_2O$ trap (116). After 5-15 minutes of heating, the quartz tube (104) was lifted from the furnace and immediately immersed in water, rapidly cooling the CoSe target. Argon flow continued while the assembly thermally cooled for 5-10 minutes. After cooling, the assembly was allowed to come to atmospheric pressure, and through manipulation of the 3-way valve (112), in five aliquots, a total of 1-10 mL of warm water was used to rinse the top ~4 cm of the quartz outlet tube and the PTFE outlet line (114) (in ice bath 115) into the initial $H_2O$ trap (116) and scrubber assembly (118) with empty, $H_2O$, and 1 mM $Na_2S_2O_5$ tubes. The collected water solution was passed through a prepared QMA light cartridge, trapping the radiobromide, which was then eluted with 700 µL of 20 mM $K_2SO_4$ in 1:1::MeCN:$H_2O$. Radiochemical yield of the distillation process was assessed by HPGe spectrometry and dose calibrator measurements.

Radiochemical Labeling Using $^{77}Br$ Product

Figure 2:
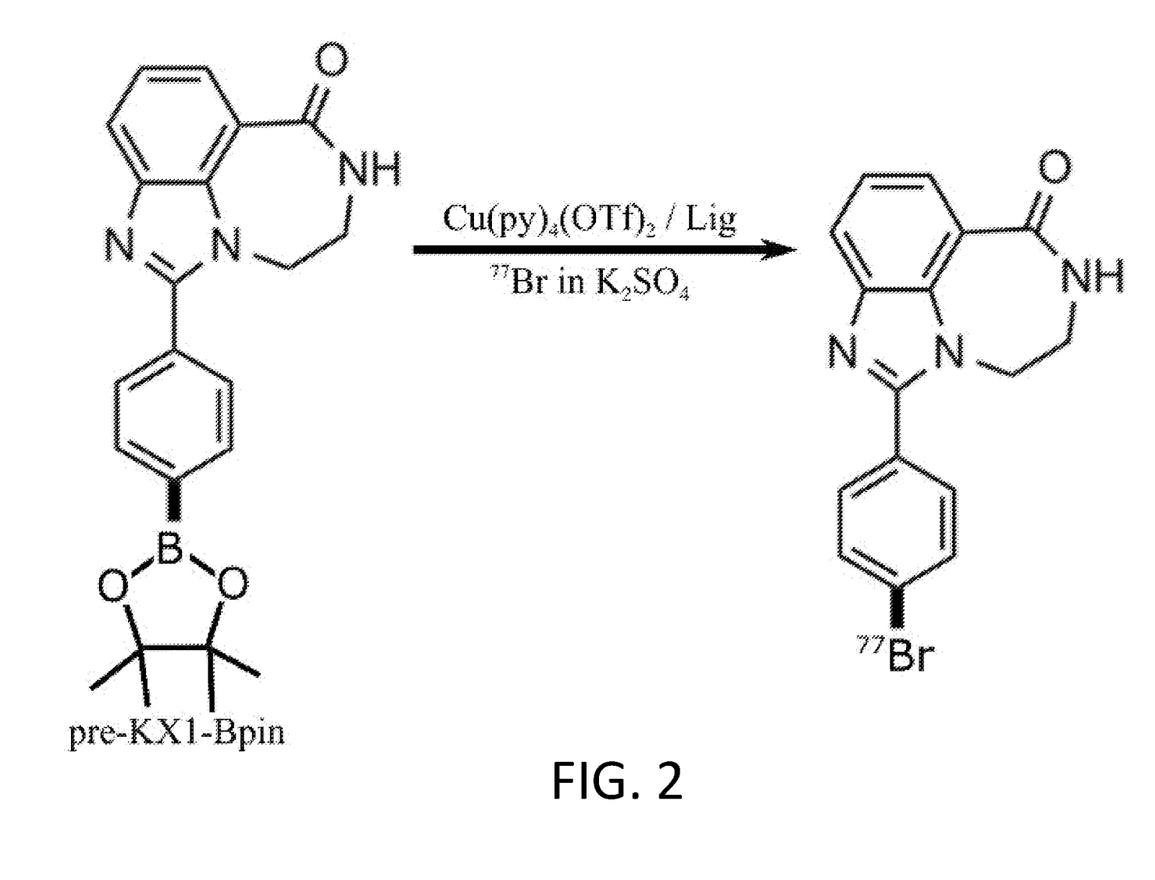
FIG. 2 depicts radiosynthesis of a $^{77}Br$-labeled PARP-1 inhibitor.

The radiochemical quality of the [$^{77}Br$]bromide in 20 mM $K_2SO_4$ was evaluated by copper-mediated aryl boronic ester bromination, synthesizing a novel $^{77}Br$-labeled analogue of the DNA damage response protein, poly ADP ribose polymerase 1 (PARP-1) inhibitor, rucaparib. The radiochemical reaction, shown in FIG. 2, was investigated by using 1 µmole pre-KX1-Bpin with varying solvent volume and composition, $K_2SO_4$ load, and temperature. Reactions were monitored by autoradiography visualized thin layer chromatography (radioTLC) on silica gel plates with 3:1::ethyl acetate:acetonitrile as mobile phase. The reactions were purified by diluting in 15 mL water, loading on a prepared C18 light cartridge, rinsing with 10 mL water, and eluting crude product in 700 µL ethanol. Following a 1:1 dilution with water, the product was purified by preparative HPLC (Kinetix XB-C18, 5 µm, 100 Å, 10×250 mm, 4 mL/min 40:60::MeCN:0.1 M ammonium formate, pH 4.5), followed by a final C18 light cartridge purification to obtain the product in a small volume of ethanol solution. Radiochemical conversion was determined by dose calibrator measurement of purified fractions. Stable iodinated KX1 was used as a standard to estimate the mass/254 nm absorbance calibration curve for the $^{77}Br$-labeled compound.

Results and Discussion

Preparation and Characterization of Cobalt Selenide Target Material

Elemental cobalt and selenium powder readily fused into solid pieces (270±20 mg) following heating at 1200° C. for 1 hour inside a vacuum ampule. Typical mass losses to the ampule walls were 6±4% (n=10). Examination of the Co—Se binary phase diagram shows that there exists an intermetallic species with stoichiometric flexibility near $Co_{0.88}Se$ with a melting point of 1078° C. (Okamoto, 1990. Binary Intermetallic compound Phase Diagrams vol. 2, Second Edition, ASM International, Materials Park, Ohio, pp. 1235-1237.)

Preparation and Characterization of CoSe Cyclotron Targets

The stepwise process of CoSe cyclotron target formation resulted in 60±10% of initial CoSe melting into the Nb pocket, with 22±4% of CoSe reclaimed as powder and a loss of 16±4% CoSe (n=2). The bulk of this loss was during the scraping and sanding of CoSe that overflowed the pocket in the target disc.

The CoSe cyclotron targets contained 180-220 mg of CoSe in a 9.5 mm diameter pocket. Calculations using SRIM estimate that this CoSe thickness would degrade 16 MeV incident protons to 10 MeV, 13 MeV protons to 5 MeV, 12 MeV protons to 3 MeV, and stop 11 MeV protons. (Ziegler et al., 2010.) Thus, while the targets were sufficiently thick to effectively maximize the production yield of (p,n) nuclear reactions from 13, 12, and 11 MeV protons, they were too thin to maximize production with 16 MeV protons.

The X-ray diffraction data taken on Nb-backed CoSe targets included peaks at 33.26°, 44.87°, 61.66°, 69.68°, and 82.26°, in good agreement with the International Centre for Diffraction Data (ICDD) Powder Diffraction File (PDF) number 04-006-8806 for hexagonal $Co_{0.85}Se$. (Zhan et al., 2000. Solid State Chem. 152, 537-539.) These data indicate the successful formation of the desired CoSe intermetallic species using these high-temperature synthesis and hot pressing methods.

Cyclotron Irradiation of CoSe Targets

Water-cooled CoSe cyclotron targets tolerated proton irradiation extremely well at all investigated proton energies (11-16 MeV) and intensities (5-40 µA). No visual changes in appearance were observed to CoSe targets following irradiation, and no mass loss was measured after irradiation. Several factors likely contributed to the exceptional performance of these targets. First, hot pressing provided excellent wetting and thermal contact between the CoSe target material and the niobium backing. Second, the direct water-jet cooling of the niobium backing allowed for very effective removal of the hundreds of watts of proton beam power deposited in the irradiation target.

Figure 3:
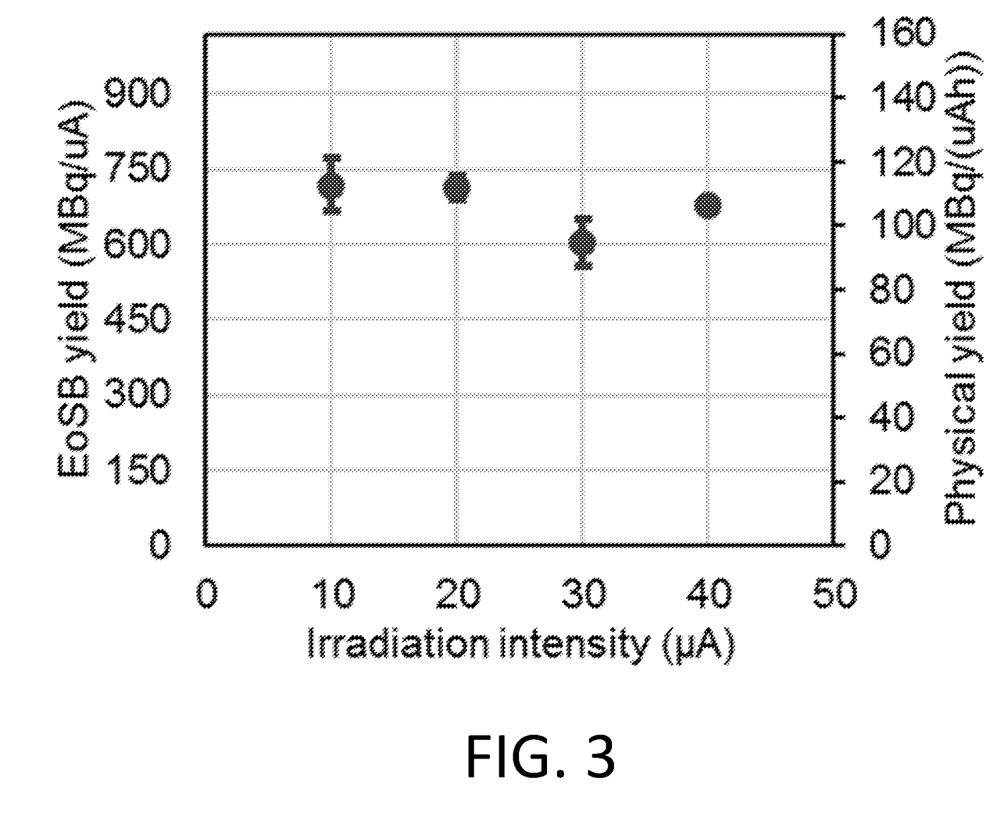
FIG. 3 depicts bromine-80m production yield from 16.1 MeV proton irradiation of $Co^{80}Se$ at various intensities, reported both as end of saturated bombardment (EoSB, MBq/μA) and physical (MBq/(μA·h)) yields. (Otuka, N. et al., 2015. Radiochim. Acta, 103(1), 1-6.)

Radiobromine yield from a $Co^{80}Se$ target was investigated as a function of 16.1 MeV proton irradiation intensity (see FIG. 3). The $^{80m}Br$ production rate was similar between 10 and 40 µA, indicating that the CoSe intermetallic target robustly retains radiobromine up to 640 watts of power deposition (at 40 µA).

Figure 4:
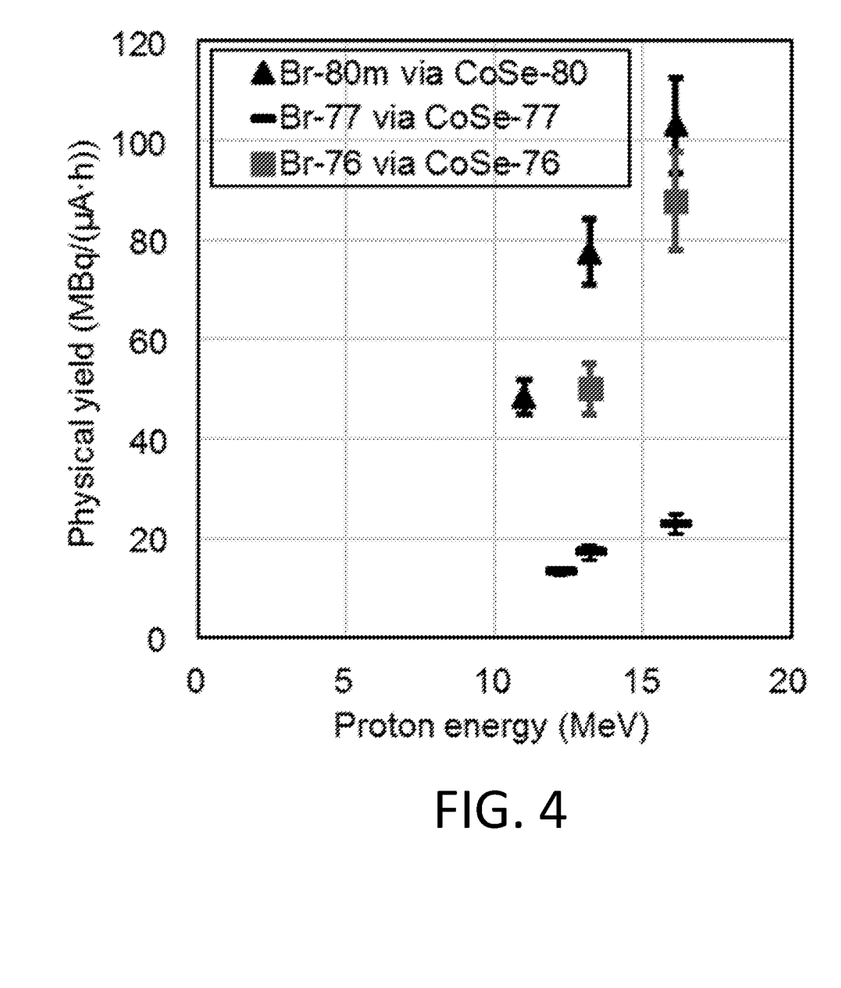
FIG. 4 depicts cyclotron production yield of $^{80m}Br$, $^{77}Br$, and $^{76}Br$ from irradiation of $Co^{80}Se$, $Co^{77}Se$, and $Co^{76}Se$, respectively, at various proton energies. Error bars represent standard deviations of results from multiple irradiations.

Targets of $Co^{nat}Se$, $Co^{80}Se$, $Co^{77}Se$, and $Co^{76}Se$ were irradiated with 5-40 µA of 11-16 MeV protons (Table 2 and FIG. 4). As shown in Table 3, the isotopically enriched target material allowed for the production of $^{77}Br$, $^{76}Br$, and $^{80m}Br$ with excellent radionuclidic purity with the exception of $^{77}Br$ produced at 16.1 MeV, where the higher energy formed $^{76}Br$ via the $^{77}Se(p,2n)^{76}Br$ nuclear reaction. The production of high radionuclidically purity $^{77}Br$ was observed at proton energies of 13 MeV or less. Minimal proton energy dependent production of $^{58}Co$ was observed with 0.14±0.05 MBq/(µA·h) at 16 MeV (n=4) and 0.02±0.01 MBq/(µA·h) at 13 MeV (n=3).

TABLE 2

Cyclotron production yield of $^{82}Br$, $^{80m}Br$, $^{76}Br$, and $^{77}Br$ from various isotopic compositions of CoSe targets at four proton energies ($E_p$). Reported uncertainties represent standard deviations of multiple irradiations and estimated when n = 1. Limits of detection calculated from HPGe spectra [Aničin and Yap, 1987] are reported. In some cases (denoted as n/a), HPGe measurements were not performed promptly enough after EoB to quantify short-lived $^{80m}Br$.

| $E_p$ (MeV) | Target comp. | n= | Physical yield (MBq/µA · h) | | | |
|---|---|---|---|---|---|---|
| | | | $^{82}Br$ | $^{80m}Br$ | $^{76}Br$ | $^{77}Br$ |
| 16 | $Co^{nat}Se$ | 4 | 2.0 ± 0.3 | 62 ± 7 | 9.9 ± 0.9 | 2.8 ± 0.4 |
| | $Co^{80}Se$ | 12 | 0.0011 ± 0.0001 | 103 ± 10 | 0.0072 ± 0.0005 | 0.006 ± 0.005 |
| | $Co^{77}Se$ | 1 | <0.07 | n/a | 12 ± ~1 | 23 ± ~2 |
| | $Co^{76}Se$ | 2 | <0.06 | n/a | 88 ± 10 | 0.05 ± ~0.005 |
| 13 | $Co^{80}Se$ | 2 | 0.0015 ± 0.0002 | 77 ± 7 | 0.0040 ± 0.0005 | <0.002 |
| | $Co^{77}Se$ | 3 | <0.02 | <0.3 | 0.07 ± 0.01 | 17 ± 1 |
| | $Co^{76}Se$ | 1 | <0.004 | n/a | 50 ± ~5 | 0.1 ± ~0.01 |
| 12 | $Co^{77}Se$ | 2 | <0.002 | <0.5 | 0.048 ± 0.001 | 13.1 ± 0.5 |
| 11 | $Co^{80}Se$ | 8 | 0.0015 ± 0.0003 | 48 ± 3 | 0.0010 ± 0.0001 | <0.002 |

TABLE 3

End of bombardment (EoB) radionuclidic purity of $^{80m}Br$, $^{77}Br$, and $^{76}Br$ produced from irradiation of various isotopic compositions of CoSe targets at various proton energies ($E_p$).

| $E_p$ (MeV) | Target comp. | EoB radionuclidic purity | |
|---|---|---|---|
| 16 | $Co^{80}Se$ | 99.99% | $^{80m}Br$ |
| | $Co^{77}Se$ | 63% | $^{77}Br$ |
| | $Co^{76}Se$ | 99.9% | $^{76}Br$ |
| 13 | $Co^{80}Se$ | 99.99% | $^{80m}Br$ |
| | $Co^{77}Se$ | 99.6% | $^{77}Br$ |
| | $Co^{76}Se$ | 99.8% | $^{76}Br$ |
| 12 | $Co^{77}Se$ | 99.6% | $^{77}Br$ |
| 11 | $Co^{80}Se$ | 99.99% | $^{80m}Br$ |

Dry Distillation of Radiobromine from CoSe Targets

Figure 5:
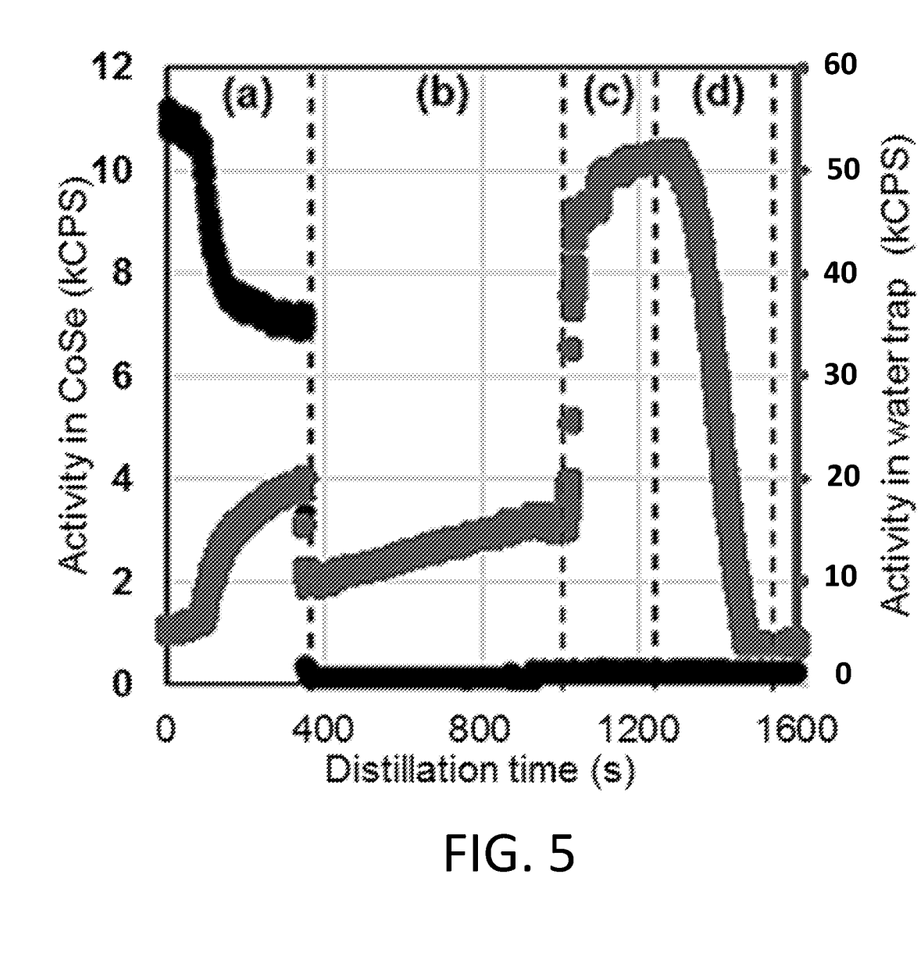
FIG. 5 (graph regions (a)-(d)) depicts typical radiation profiles in kilocounts per second (kCPS) of radiation detectors in a radiobromine distillation apparatus. Detector collimated on CoSe (106) is shown in black on the left y-axis while detector collimated on the initial $H_2O$ trap (116) is shown in grey on the right y-axis.

The isolation of radiobromine from proton irradiated CoSe was readily accomplished by dry distillation at 1050° C. in the vertical furnace assembly shown in FIG. 1. Typical traces of the detectors collimated on the CoSe target (106) and initial $H_2O$ trap (116) are shown in FIG. 5, graph regions (a)-(d). Following the lowering of the assembly into the preheated furnace, radiobromine was distilled from the CoSe in 5-6 minutes. Some non-bromine radioactivity remained in the CoSe target, including $^{93m}Mo$ and $^{58}Co$, as shown in FIG. 5, graph region (a). The CoSe was then removed from the furnace in the quartz tube and cooled in water for 10-15 minutes with Ar flow. During cooling (FIG. 5, graph region (b)), the migration of radiobromine was observed through the continuous increase in radiation signal in the $H_2O$ trap detector. After cooling, argon flow was halted, the assembly was allowed to come to atmospheric pressure, and the quartz outlet tube (108) and the PTFE outlet line (114) were rinsed with warm water into the initial $H_2O$ trap (116), moving radiobromine into the $H_2O$ trap (FIG. 5, graph region (c)). After rinsing, the water contained in the $H_2O$ trap was passed through the prepared QMA light cartridge with Ar back pressure (FIG. 5, graph region (d)). Radiobromide was reclaimed from the QMA cartridge by slowly eluting with 700 µL of 20 mM $K_2SO_4$ in 1:1:: $CH_3CN:H_2O$.

Brassy, black, and red deposits of cobalt and selenium were observed along the quartz outlet tube between the top of the furnace and the level of the Ar gas inlet (102). Additionally, very faint red deposits were visible after distillation in the PTFE outlet line (114) and in the initial $H_2O$ trap (116). Despite this, the loss of macroscopic cobalt and selenium target material was minimal. A $Co^{77}Se$ target exhibited a total mass loss of 5.3 mg (~3% of total $Co^{77}Se$ target material) after six irradiations (220 µA·h total) and four distillations. Additionally, a $Co^{80}Se$ target seeing 22 irradiations (650 µA·h total) and 13 distillations continued to demonstrate no significant change to its $^{80m}Br$ production yield despite extensive use. The durability of the CoSe targets is likely due to the inherent properties of the CoSe intermetallic species, to the minimal amount of time the targets were heated during distillation, and to the rapid quenching to prevent hot CoSe from partitioning into less resilient cobalt- and selenium-containing species during cool down.

Radiochemical yield of the dry distillation process was 55±25% (n=12) of cyclotron produced radiobromine recovered in a small volume of aqueous solution suitable for radiochemistry. For some distillations, low yield of 33±14% (n=6) was attributed to furnace malfunction, QMA cartridge degradation, loose fittings, improper cleaning of quartz outlet tubes, or the accidental inclusion of radiobromine-absorbing rubber tubing. Excluding these results, a radiobromine yield of 76±11% (n=6) was observed.

Radiochemical Labeling using $^{77}Br$ Product

Following radiochemical isolation by dry distillation, the [$^{77}Br$]bromide was used for reaction in a copper-mediated aryl boronic ester bromination to study its radiochemical lability and molar activity. [$^{77}Br$]Bromide in 20 mM $K_2SO_4$, 1:1:: $MeCN:H_2O$ was either used directly or following a fast and lossless drying step under argon flow at 120° C. Radiochemical conversions from 4.7-95% were observed for the reaction conditions, as summarized in Table 4. Reaction conditions {1-4} were adapted from work by Reilly et al., and the conditions in {5} were adapted from the work by Zhou et al. (Reilly, S. W. et al., 2018. Org. Lett. 20, 1752-1755 and Zhou, D., et al., 2018. Tetrahedron Letters 59, 1963-1967.) In general, larger reaction volumes and larger water contents negatively affected reactivity, as evidenced by the increase in radiochemical conversion between reactions {2} and {4} from 16% to 26%. Additionally, the use of dimethylsulfoxide (DMSO) as the reaction solvent combined with elevated reaction temperature (80° C.) as in reaction {5} improved radiochemical conversion compared with the similar reaction conditions of {2}, despite lacking the 3,4,7,8-tetramethyl-1,10-phenanthroline as an auxiliary ligand.

The presence of the $K_2SO_4$ significantly impeded the bromination reaction, likely as a result of its coordination and deactivation of the tetrakis(pyridine)copper (II) triflate catalyst. Copper sulfate is a poor catalyst in copper-mediated [$^{18}F$]fluorination of boronic acids. Comparison of reactions {2} and {4} demonstrates that the hot DMSO conditions proposed by Zhou et al. appear more tolerant to the presence of $K_2SO_4$. (Zhou et al., 2018.) Potassium sulfate was included in these reactions as it is an effective, non-basic QMA release agent for [$^{77}Br$]bromide.

The collected purified fractions of $^{77}Br$-labeled compound were repurified by preparative HPLC to obtain a clean 254 nm absorbance peak coeluting with the radiopeak. Based on absorbance measurements of the iodinated compound, the mass corresponding to $^{77}Br$-labeled compound was estimated, yielding an apparent molar activity of 520 GBq/µmole (14 Ci/µmole) at the time of analysis. This value is ~25% of the theoretical maximum $^{77}Br$ molar activity of 2000 GBq/µmole (55 Ci/µmole).

TABLE 4

Radiochemical reaction conditions and radiochemical conversion results of the reaction of [$^{77}Br$]bromide in a copper-mediated aryl boronic ester bromination.

| | Reaction solvent | | pre-KX1-Bpin (µmol) | $Cu(py)_4(OTf)_2$ (µmol) | Lig (µmol) | $K_2SO_4$ (µmol) | Temp (° C.) | Time (min) | Radiochemical conversion (%) |
|---|---|---|---|---|---|---|---|---|---|
| | volume (µL) | composition | | | | | | | |
| {1} | 70 | 11:2:1 ::: $MeCN:MeOH:H_2O$ | 1 | 0.5 | 0.5 | 0.2 | 20 | 60 | 95 |
| {2} | 110 | 7.5:1:2.5 ::: $MeCN:MeOH:H_2O$ | 1 | 0.5 | 0.5 | 1 | 20 | 90 | 16 |
| {3} | 160 | 10:1:50 ::: $MeCN:MeOH:H_2O$ | 1 | 0.5 | 0.5 | 2 | 20 | 110 | 4.7 |
| {4} | 65 | 8:2:1 ::: $MeCN:MeOH:H_2O$ | 1 | 0.5 | 0.5 | 1 | 20 | 45 | 26 |
| {5} | 140 | 30:1 :: $DMSO:H_2O$ | 1 | 0.5 | 0 | 1.4 | 80 | 45 | 31 |

Example 2: Production of Germanium Radionuclides from Cobalt Gallium Intermetallic Compounds This example describes a method by which high radionuclidic purity $^{69}Ge$ is produced via the proton irradiation of $Co^{nat}Ga$ targets.

CoGa targets were made by weighing and combining cobalt and gallium masses in round-bottom quartz glass test tubes in atom ratios of Co:Ga 1:2, 1:3, and 1:4. As indicated by their binary phase diagram, these atom ratios were expected to have melting points between 1075 and 925° C., respectively. The combined masses of cobalt and gallium (~500 mg each) were flushed with argon gas, evacuated to ~$10^{-4}$ bar using a roughing pump, and then sealed into ampoules with an oxypropane torch. The quartz glass ampoules were then placed in a Thermolyne Model 10500 furnace and heated to a temperature above the indicated melting temperature (1100° C. for 1:2::Co:Ga, 1050° C. for 1:3::Co:Ga, and 950° C. for 1:4::Co:Ga) for about 2 hours before being removed and rapidly quenched to room temperature in a water bath. The ampoules were then breached, and the resulting pellets were weighed to assess the change in mass during forging.

Pellets with Co:Ga atom ratios 1:3 and 1:4 (n=3 each) were then hot-pressed into niobium crucibles. This was accomplished by placing an empty niobium crucible (19 mm wide, 2 mm deep niobium coin with a centered 9.5 mm OD×1 mm deep cavity) in a flat bottom, quartz tube, and then placing a sample pellet in the crucible pocket. Then a boron nitride tamp was placed on top of the pellet and held in place by a quartz glass, bell-ended rod. The quartz tube assembly was sealed with gas adapters, flushed with a continuous nitrogen gas flow, and lowered into the preheated, vertical tube furnace cavity. The furnace temperature settings were the same as those listed above for the various atom ratios. After 5 minutes of exposure to the heat of the furnace, the pellet became malleable, and the glass rod was depressed manually to fill the crucible pocket with the sample. Finally, the assembly was removed from the furnace and rapidly quenched to room temperature in a water bath. Both empty crucibles and hot-pressed crucibles were weighed to quantify any mass loss.

The hot-pressed material and backings were mounted in a cyclotron target holder with a water jet directed onto the back of the target. A 200 μm molybdenum containment foil mounted to the front of the target prevented interaction between the target material and cyclotron components. This target holder was in turn mounted on a GE PETtrace 16 MeV (H+) cyclotron and irradiated with beam intensities ranging from 10-35 μA for 30-60 minutes. Produced radioactivity and radionuclidic purity was quantified by High Purity Germanium crystal (HPGe) gamma spectrometry of the targets.

Following irradiation with ~13 MeV protons, radiochemical isolation of the germanium isotope was carried out by single column extraction chromatography using an extraction resin functionalized with N,N,N',N'-tetrakis-2-ethyl-hexyldiglycolamide (branched DGA, Eichrom), as described in H. F. Valdovinos (2017), "Production, labeling and in vivo studies with the theranostic positron-emitting radiometals $^{44}$Sc $^{55/58m/58g}$Co, $^{61/64}$Cu, $^{86}$Y and $^{69}$Ge," PhD Dissertation, University of Wisconsin-Madison, Madison, WI Irradiated targets were dissolved in 1-2 hours with 5 mL of c. $HNO_3$. Aliquots of the dissolved targets were diluted with c. $HNO_3$ and loaded onto approximately 200 mg of resin. The column was subsequently rinsed with c. $HNO_3$ and eluted with approximately 1.5 mL 0.1 M $HNO_3$. The contents of the load, wash, and elution fractions were quantified by HPGe to track the retention of the $^{69}$Ge$^{4+}$ ions on the resin columns and in the different eluates.

Results

The masses of cobalt powder and chunks of gallium sealed in the ampules were observed to have formed orange-hot, glowing pellets when removed from the furnace immediately prior to quenching. The average change in mass during the pellet forging in the ampules observed initially was less than 5%. The average change in mass during the pellet pressing observed initially was less than 1%. None of the targets showed any appreciable melting or mass loss during the irradiation with up to 5 μA of ~13 MeV protons. For $^{69}$Ge, the first 1:3::Co:Ge atom ratio target irradiated showed an experimental yield of 0.36 mCi/(μA h). The targets dissolved in c. $HNO_3$ produced a dark reddish-brown solution. Initial separation results showed over 60% retention of the $^{69}$Ge on the branched DGA resin.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method of generating a radionuclide comprising bombarding a target material comprising an isotopically enriched cobalt intermetallic compound of comprising cobalt and selenium with bombarding particles in a particle accelerator, wherein the selenium is isotopically enriched in the target material and the target material contains from 50 mol. % to 60 mol. % of the selenium wherein the bombarding particles have energies that are sufficiently high to induce a nuclear reaction that produces the radionuclide from the cobalt intermetallic compound.

2. The method of claim 1, wherein the particle accelerator is a proton accelerator.

3. The method of claim 2, wherein the proton accelerator is a cyclotron.

4. The method of claim 1, wherein the radionuclide is a radionuclide of bromine.

5. The method of claim 1, wherein the radionuclide is a radionuclide of arsenic.

6. A target material comprising an isotopically enriched cobalt intermetallic compound comprising cobalt and selenium, wherein the selenium is isotopically enriched in the target material, and further wherein the target material contains from 50 mol. % to 60 mol. % of the selenium.

7. The target material of claim 6, wherein the target material is in a form of a disc or a pellet.

8. The target material of claim 6, wherein the selenium in the isotopically enriched cobalt intermetallic compound is a selenium isotope selected from the group consisting of $^{76}$Se, $^{77}$Se, $^{78}$Se, and $^{80}$Se.

* * * * *